United States Patent
Hemenway, Jr. et al.

(10) Patent No.: US 9,515,736 B2
(45) Date of Patent: Dec. 6, 2016

(54) SYSTEMS FOR DIFFERENTIAL OPTICAL SIGNALING

(71) Applicant: Corning Incorporated, Corning, NY (US)

(72) Inventors: Brewster Roe Hemenway, Jr., Painted Post, NY (US); Ioannis Roudas, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 457 days.

(21) Appl. No.: 13/899,842

(22) Filed: May 22, 2013

(65) Prior Publication Data

US 2014/0205300 A1  Jul. 24, 2014

Related U.S. Application Data

(60) Provisional application No. 61/651,599, filed on May 25, 2012.

(51) Int. Cl.
*H04B 10/00* (2013.01)
*H04B 10/2575* (2013.01)
(Continued)

(52) U.S. Cl.
CPC ...... *H04B 10/2575* (2013.01); *H04B 10/2581* (2013.01); *H04J 14/00* (2013.01); *H04J 14/04* (2013.01); *H04L 27/02* (2013.01)

(58) Field of Classification Search
CPC ........... H04B 10/2575; H04B 10/2581; H04J 14/00; H04J 14/04; H04L 27/02
See application file for complete search history.

(56) References Cited

U.S. PATENT DOCUMENTS 4,965,858 A * 10/1990 Naito .................. H04B 10/61
398/204
5,181,134 A * 1/1993 Fatehi .................. G02B 6/28
385/17

(Continued)

FOREIGN PATENT DOCUMENTS

EP        0403991        12/1990

OTHER PUBLICATIONS

P.E. Green et al; Fiber optics network; Pretince Hall, Englewood Cliffs, NJ, 1993, p. 124.*

(Continued)

*Primary Examiner* — Ken N Vanderpuye
*Assistant Examiner* — Amritbir Sandhu
(74) *Attorney, Agent, or Firm* — Svetlana Z. Short

(57) ABSTRACT

According to one embodiment, a system for transmitting differential optical signals can include an optical modulation device, a multi-core optical waveguide, and a balanced optical receiver. The optical modulation device can include at least one optical input port and multiple optical output ports. The optical modulation device can transform the optical input signal into multiple complimentary modulated optical signals that are transmitted from the multiple optical output ports. The multi-core optical waveguide can include multiple cores disposed within a cladding material. The multiple cores, the cladding material, or both can be configured to mitigate transmission of optical energy between the multiple cores. The balanced optical receiver can include multiple photodetectors. The balanced optical receiver can be communicatively coupled to the multiple cores of the multi-core optical waveguide. Each of the multiple photodetectors can transform at least one of the multiple complimentary modulated optical signals into an electrical signal.

20 Claims, 11 Drawing Sheets

(51) Int. Cl.
  *H04B 10/2581* (2013.01)
  *H04J 14/04* (2006.01)
  *H04J 14/00* (2006.01)
  *H04L 27/02* (2006.01)

(56) References Cited

U.S. PATENT DOCUMENTS

| | | | |
|---|---|---|---|
| 5,235,455 A | 8/1993 | Berry et al. | |
| 5,253,309 A | 10/1993 | Nazarathy et al. | |
| 5,448,536 A * | 9/1995 | Muranishi | G11B 7/127 369/13.28 |
| 6,281,658 B1 * | 8/2001 | Han | H02M 1/4225 318/729 |
| 6,293,081 B1 * | 9/2001 | Grulick | G02B 6/449 174/112 |
| 6,304,369 B1 * | 10/2001 | Piehler | H04B 10/2507 359/337.4 |
| 6,445,474 B1 | 9/2002 | Dubos et al. | |
| 6,574,022 B2 | 6/2003 | Chow et al. | |
| 8,364,042 B2 * | 1/2013 | Shastri | H04B 10/801 398/141 |
| 8,923,380 B1 * | 12/2014 | Malhotra | H04B 1/16 375/232 |
| 2006/0060759 A1 * | 3/2006 | Predina | G01J 1/08 250/216 |
| 2007/0133918 A1 * | 6/2007 | Cho | G02F 1/225 385/1 |
| 2009/0003755 A1 * | 1/2009 | Liu | G02F 1/2257 385/3 |
| 2010/0202785 A1 * | 8/2010 | Kawanishi | H04B 10/5053 398/185 |
| 2010/0260504 A1 | 10/2010 | Takahara | |
| 2010/0316391 A1 * | 12/2010 | Shastri | H04B 10/801 398/141 |
| 2011/0008054 A1 | 1/2011 | Castanon Avila et al. | |
| 2011/0052129 A1 * | 3/2011 | Sasaoka | G02B 6/02042 385/126 |
| 2011/0235983 A1 * | 9/2011 | Hayashi | G02B 6/02042 385/100 |
| 2012/0087616 A1 * | 4/2012 | Ichioka | G02F 1/3137 385/2 |
| 2012/0177065 A1 * | 7/2012 | Winzer | H04B 10/2581 370/480 |
| 2012/0183304 A1 * | 7/2012 | Winzer | G02B 6/02042 398/142 |
| 2012/0257896 A1 * | 10/2012 | Djordjevic | H04B 10/548 398/65 |
| 2013/0136404 A1 * | 5/2013 | Feuer | G02B 6/02042 385/124 |
| 2013/0136410 A1 * | 5/2013 | Sasaoka | G02B 6/0365 385/126 |
| 2014/0064687 A1 * | 3/2014 | Hoover | G02B 6/03644 385/126 |
| 2014/0161439 A1 * | 6/2014 | Nolan | H04B 10/2581 398/16 |
| 2014/0321863 A1 * | 10/2014 | Diab | H04B 10/272 398/185 |
| 2015/0110502 A1 * | 4/2015 | Hosking | H04B 10/564 398/182 |
| 2016/0080102 A1 * | 3/2016 | Fang | H04J 14/005 398/74 |

OTHER PUBLICATIONS

J.G. Proakis et al; Digital Communications, 4th ed. New York: McGraw-Hill, 2001, pp. 174-179.*
B.E.A. Saleh and M.C. Teich, Fundamentals of Photonics, Ch 7 Wiley New York, 1991.*
Helkey, Roger "Relative-Intensity-Noise Cancellation in Bypass External-Modulation Links", IEEE Transactions on Microwave Theory and Techniques, IEEE Service Center, Piscataway, NJ, US, vol. 46, No. 12, Dec. 1, 1998, XP011037403, Fig 1b.
International Search Report dated Sep. 12, 2013, 1-4, International Patent Application No. PCT/US2013/041762, European Patent Office, The Netherlands.
Written Opinion of the International Searching Authority, dated Sep. 12, 2013 pp. 1-7, International Patent Application No. PCT/US2012/051967, European Patent Office, The Netherlands.
G. P. Agrawal, *Fiber-optic communication systems*, 3rd ed. New York: Wiley, 2003.
Chung-Sheng Li et. Al. "Differential Board/Backplane Optical interconnects for High Speed Digital Systems, Part 1: Thoery," IEEE J. Lightwave Technol. vol. 11. No. 7. Jul. 1993.
Ping Gui, et.al. "A 2-Bb/s 0.5um CMOS parallel optical transceiver . . . " IEEE Journal Lightwave Technol vol. 22. No. 9, Sep. 2004, p. 2135-2148.
Venditti, et. al "Design and test of an Optoelectronic-VLSI Chip with 540 . . . " IEEE J. Quant. Electronics, vol. 9, No. 2 Mar./Apr. 2003. p. 361.
Chiarulli et.al "Efficient Optical Communications Using Multi Bit Differential Signaling," Nanophotonic Packaging SPIE vol. 6126 (2006).
Chung-Sheng Li et.al "Fully Differential Optical interconnections for High Speed Digital Systems," IEEE Trans. On Very Large Scale Integration (VSLI) Systems, vol. 1, No. 2 Jun. 1993.
S. Randel et al., *IEEE Journal of Selected Topics in Quantum Electronics*, vol. 16, No. 5, pp. 1280-1289, Sep.-Oct. 2010.
Khalighi et.al, "Double Laser Differential Signaling for Reducing the Effect of background radiation in free space optical systems."
M. Seimetz, "Performance of coherent optical square-16-QAM-systems based on IQ-transmitters and homodyne receivers with digital phase estimation," in *Proc. Optical Fiber Communication (OFC)*, paper NWA4, Anaheim, CA, Mar. 2006.
M. Asghari, in *Proc. Optical Fiber communication (OFC)*, paper NthA4, San Diego, CA, Feb. 2008.
Y. Doi, H. Yamazaki, and T. Yamada, in Proc. *IEEE Photonics Society Annual Meeting*, pp. 397-398, Boulder, CO, Nov. 2010.
P. Winzer, *IEEE Com. Mag.*, vol. 48, No. 7, pp. 26-30, Jul. 2010.
P.J. Winzer, A. H. Gnauck, C. R. Doerr, M. Magarini, and L. L. Buhl, "Spectrally efficient long-haul optical networking using 112-Gb/s polarization-multiplexed 16-QAM," *J. Lightwave Technology*, vol. 28, No. 4, pp. 547-556, Feb. 2010.
en.wikipedia.org/wiki/Low-voltage_differential_signaling.
J. G. Proakis, Digital Communications, 4th ed. New York: McGraw-Hill, 2001, pp. 174-179.
B. E. A. Saleh and M. C. Teich, Fundamentals of Photonics. Ch 7, Wiley, New York, 1991.
P. E. Green, Fiber Optic Networks. Prentice Hall, Englewood Cliffs, NJ, 1993, p. 124.

* cited by examiner

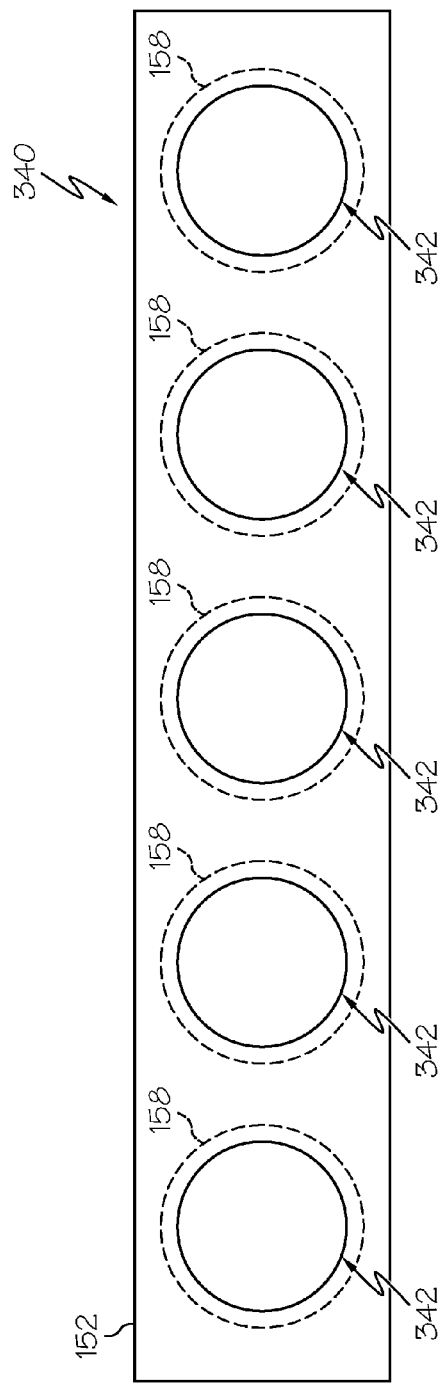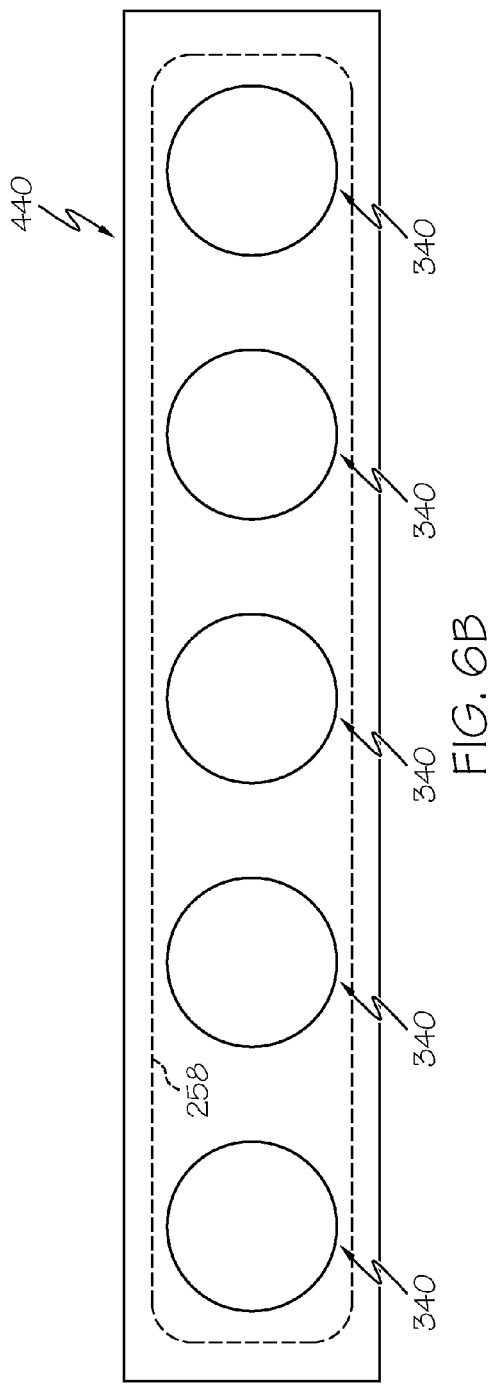

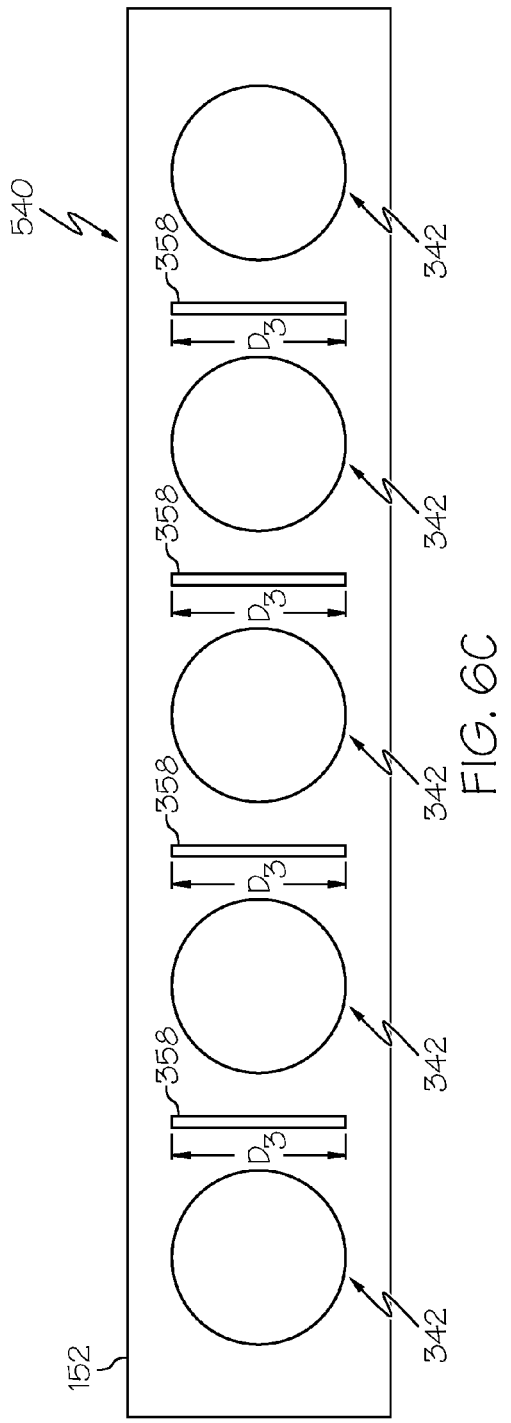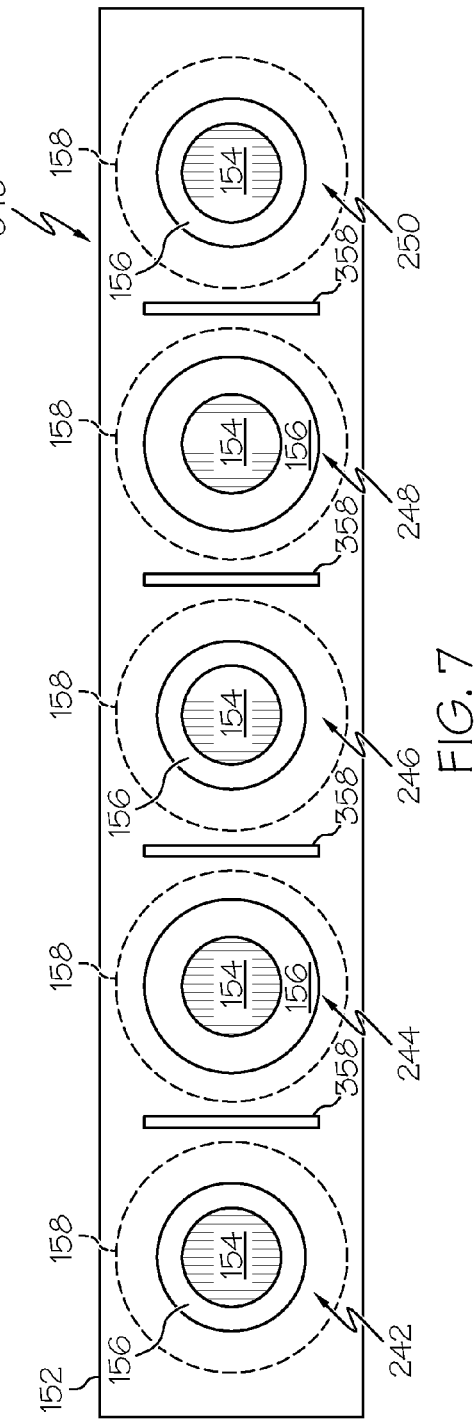

SYSTEMS FOR DIFFERENTIAL OPTICAL SIGNALING

CROSS REFERENCE TO RELATED APPLICATIONS

This application claims the benefit of priority under 35 U.S.C. §119 of U.S. Provisional Application Ser. No. 61/651,599 filed on May 25, 2012 the content of which is relied upon and incorporated herein by reference in its entirety.

BACKGROUND

1. Field

The present specification generally relates to systems for differential optical signaling and, more specifically, to systems for differential optical signaling of M-ary modulation formats.

2. Technical Background

Short reach high-speed optical interconnects can be utilized for a variety of high performance computer and datacenter applications. In many optical interconnects such as laser/external modulator links operating with on-off keying, about one half of the optical power generated by a laser is unused. Specifically, the external modulator links generally suppress the laser power during the off state. Moreover, when on-off keying modulation is received, the optimum decision threshold can float relative to the received optical power, i.e., the higher the power, the higher the threshold. Accordingly, the optimum decision threshold adapts with the optical signal power or the noise variances in the one and zero states.

Optical differential signaling generally includes the transmission of two or more complementary signals on multiple separate transmission channels. The complementary signals can be combined upon receipt to extract data encoded in the signals. Optical differential signaling can be difficult to implement in an optical fiber transmission system due to the cost of matched group delay and regeneration. Wavelength division multiplexing in a single fiber can be used to overcome the difficulties associated with matching optical fiber delays when using two discrete fibers. However, it can be difficult to generate such a modulated signal with a single modulator. Moreover, the chromatic dispersion of the link must be matched in wavelength division multiplexing.

Accordingly, a need exists for alternative systems for differential optical signaling.

SUMMARY

According to one embodiment, a system for transmitting optical signals can include an optical modulation device, a multi-core optical waveguide, and a balanced optical receiver. The optical modulation device can include at least one optical input port and multiple optical output ports. An optical input signal having an input power can be received at the at least one optical input port. The optical modulation device can transform the optical input signal into multiple complimentary modulated optical signals that are transmitted from the multiple optical output ports each having an output power. A sum of the output power of the multiple complimentary modulated optical signals can be substantially equal to the input power of the optical input signal that was received by the at least one optical input port of the optical modulation device. The multi-core optical waveguide can be optically coupled to the multiple optical output ports of the optical modulation device. The multi-core optical waveguide can include multiple cores disposed within a cladding material. The multiple cores, the cladding material, or both can be configured to mitigate exchange of optical energy between the multiple cores. The balanced optical receiver can include multiple photodetectors. The balanced optical receiver can be communicatively coupled to the multiple cores of the multi-core optical waveguide. Each of the multiple photodetectors can transform at least one of the multiple complimentary modulated optical signals into an electrical signal. The electrical signal of the multiple photodetectors of the balanced optical receiver can be combined to form a pulse amplitude modulated signal.

Additional features and advantages of the invention will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIGS. 6A-6C schematically depict multi-core optical waveguides according to one or more embodiments shown and described herein;

FIG. 7 schematically depicts a multi-core optical waveguide according to one or more embodiments shown and described herein;

DETAILED DESCRIPTION

Figure 1:
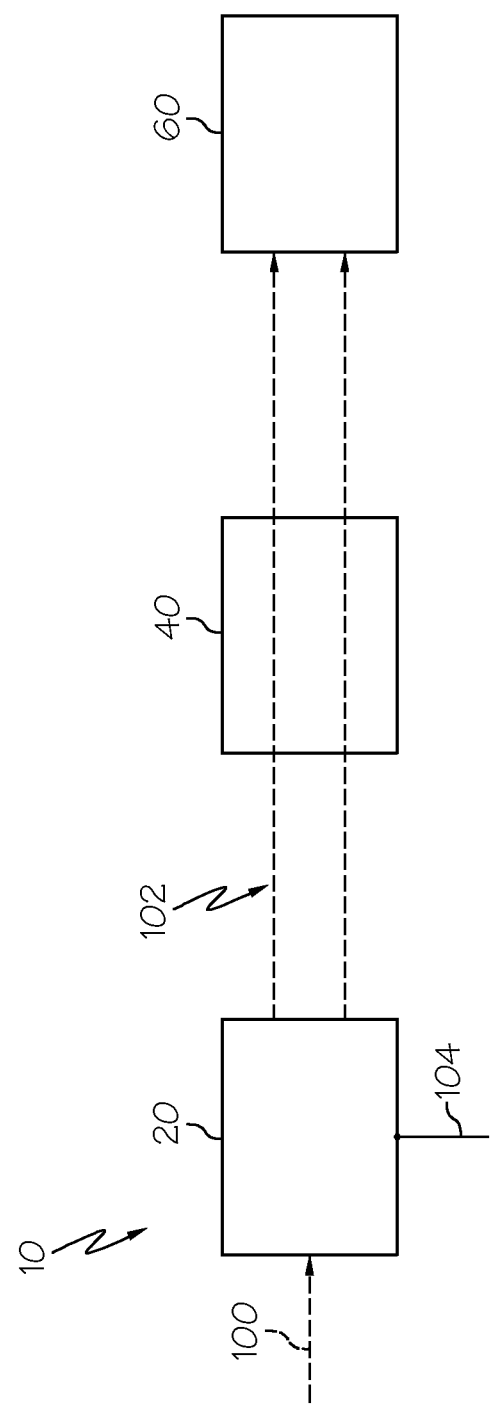
FIG. 1 schematically depicts a system for differential optical signaling according to one or more embodiments shown and described herein.

Reference will now be made in detail to embodiments of the present disclosure, examples of which are schematically depicted in the accompanying drawings. Whenever possible, the same reference numerals will be used throughout the drawings to refer to the same or like parts. One embodiment of a system for differential optical signaling is shown in FIG. 1, and is designated generally throughout by the reference numeral 10.

Throughout the present disclosure, reference will be made to the terms light or optical. The terms "light" and "optical" as used herein refer to radiation having various wavelengths associated with of the electromagnetic spectrum, including, but not limited to, wavelengths in the ultraviolet (UV), infrared (IR), and visible portions of the electromagnetic spectrum.

Referring now to FIG. 1, a system 10 for differential optical signaling can include an optical modulation device 20 for transforming an optical input signal 100 into multiple complimentary modulated optical signals 102. The optical modulation device 120 can be configured such that one or more output signals of the optical modulation device 120 can simultaneously have one or more complementary output signals. In some embodiments, optical modulation device 120 can modulate the amplitude of the optical input signal 100 such that the sum of the power of the complimentary modulated optical signals 102 is substantially equal (neglecting input/output coupling loss, propagation loss and the like) to the power of the optical input signal 100 that was received by the optical modulation device 20. Specifically, substantially all of the incident light signal(s) received by the optical modulation device 20 over a period of time is subsequently transformed into one or more output light signals that are transmitted by the optical modulation device 20. Each of the time periods can be any time period from about substantially instantaneous to multiple input or output signal periods. It is noted that the term "signal" means an arbitrary waveform, such as DC, AC, sinusoidal-wave, triangular-wave, square-wave, vibration, and the like, capable of traveling through a medium.

In some embodiments, the optical modulation device 20 can be configured to receive a modulating signal 104 that can be utilized to control the transformation of the optical input signal 100 into multiple complimentary modulated optical signals 102. For example, when the optical modulation device 20 is an electro-optic modulator, the modulation signal can be an electrical data signal and the optical input signal can be modulated according to the electrical data signal.

Figure 2:
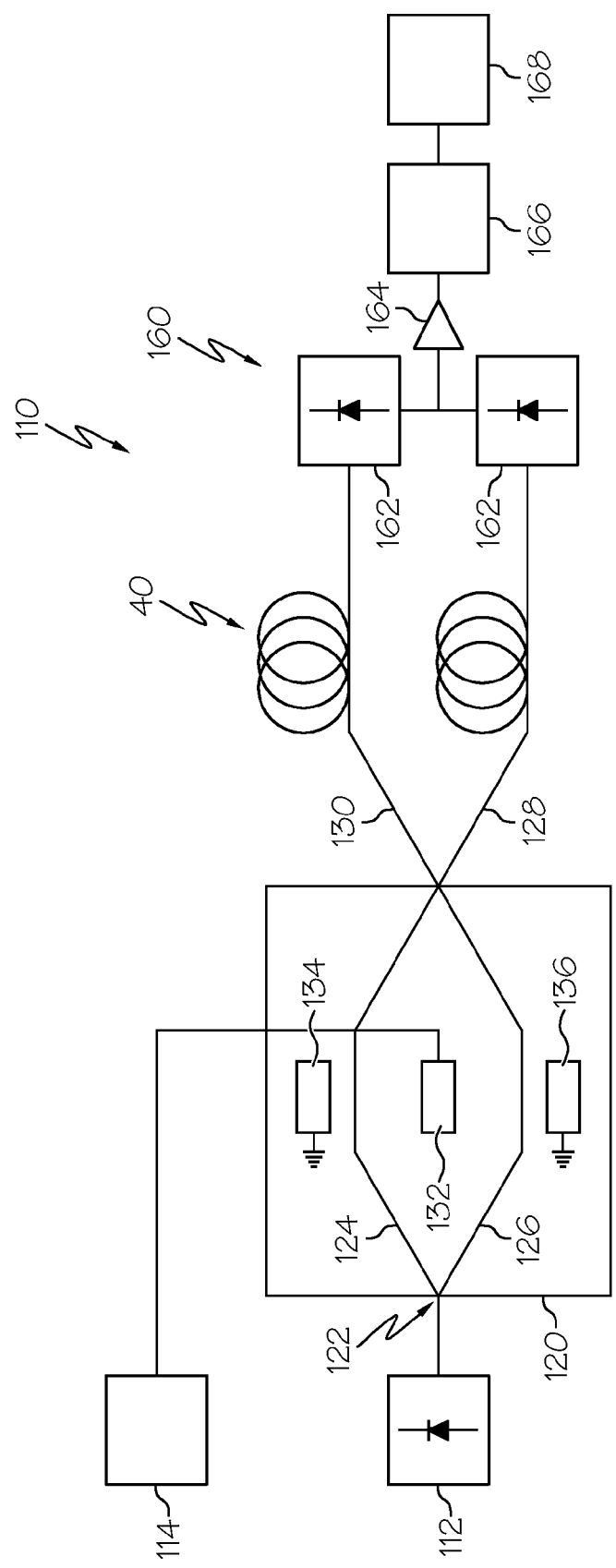
FIG. 2 schematically depicts a system for differential optical signaling according to one or more embodiments shown and described herein.

Referring now to FIG. 2, in one embodiment, the system 110 for differential optical signaling can comprise an optical modulation device 120 formed from a Mach-Zehnder modulator (MZM). The optical modulation device 120 can comprise an optical input port 122 for receiving an optical signal. The optical input port 122 can be split into a first optical path 124 that optically couples the optical input port 122 to a first optical output port 128 and a second optical path 126 that optically couples the optical input port 122 to a second optical output port 130. The optical modulation device 120 can further include a first electrode 132, a second electrode 134 and a third electrode 136 that can be utilized to control the phase difference between light signals traversing the first optical path 124 and a second optical path 126.

Additionally or alternatively, the optical modulation devices described herein can include any optical modulator that outputs light signals having a power such that substantially all the light power incident upon the modulator is transmitted such as, for example, a lithium niobate electro-optic or silicon free carrier microring resonator (MRR) or Mach-Zehnder interferometer (MZI), or any other electro-optic amplitude modulator. Specific examples include conventional optical modulators having dual output ports such that the optical signal if not present on one port is automatically present on the other port. Some embodiments can utilize an MZI or MRR modulators having two output ports such that the second port, which often is dedicated to biasing the modulator locally, is instead utilized as an optical output. It is noted that, while the embodiments described above include electro-optic amplitude modulators, the embodiments described herein can utilize any type of device that modulates a parameter of a light signal to output complimentary optical signals such as amplitude modulators, phase modulators, polarization modulators, frequency modulators, or the like. Moreover, suitable optical modulators include, but are not limited to, electro-optic modulators, acousto-optic modulators, magneto-optic modulators, mechano-optical modulators, thermo-optic modulators, or combinations thereof.

Referring again to FIG. 1, the system 10 for differential optical signaling can include a multi-core optical waveguide 40 optically coupled to the optical modulation device 20 for transmitting the multiple complimentary modulated optical signals 102. Each core of the multi-core optical waveguide 40 can be configured to function in a manner analogous to a single mode optical waveguide, a few-mode optical waveguide, or a multimode optical waveguide. It is noted that, the phrase "optically coupled," as used herein, means that components are capable of exchanging light with one another via one or more intermediary mediums such as, for example, electromagnetic signals via air, optical signals via optical waveguides, optical signals via optical couplers, or the like. It is furthermore noted that the embodiments described herein need not be limited to optical waveguides. Specifically, the optical modulation device 20 can be coupled to the balanced optical receiver via one or more free space links.

The multi-core optical waveguide 40 can comprise any material that is transmissive to light such as, for example, silica fiber. The multi-core optical waveguide 40 can be configured such that each core has the same group delay. Specifically, each core of the multi-core optical waveguide 40 that is optically coupled to the optical modulation device 20 can transmit the multiple complimentary modulated optical signals 102 to a target such that each of the multiple complimentary modulated optical signals 102 arrive at the target substantially simultaneously (e.g., with a relative delay of much less than a bit or symbol period). In some embodiments, each core of the multi-core optical waveguide 40 can be fabricated simultaneously in the same cladding to reduce relative delay.

Figure 3:
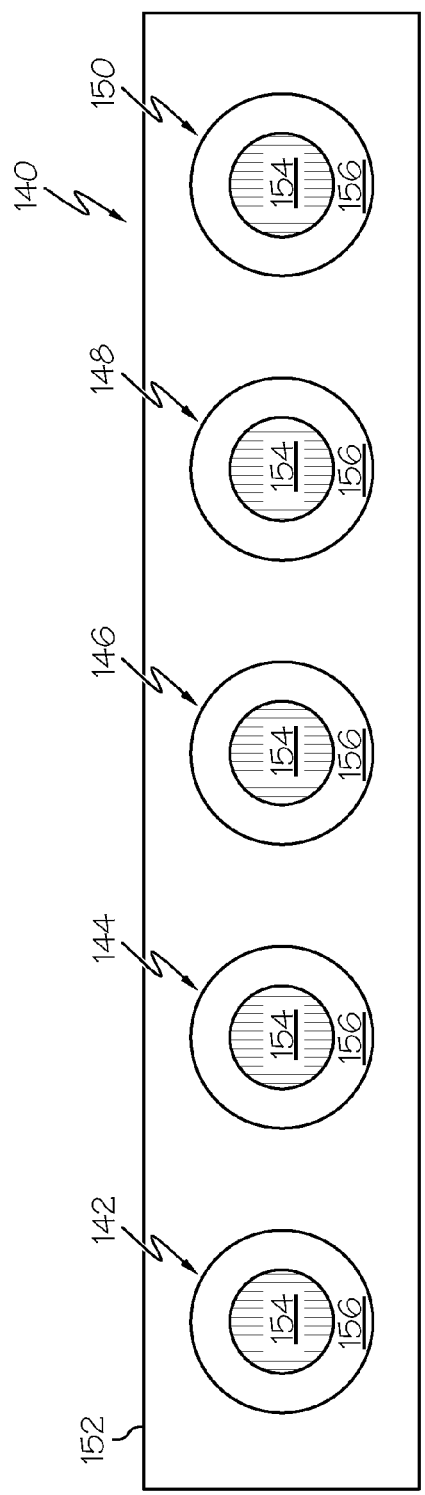
FIG. 3 schematically depicts a multi-core optical waveguide according to one or more embodiments shown and described herein.

Referring now to FIG. 3, in one embodiment, the multi-core optical waveguide 140 can comprise a first core 142, a second core 144, a third core 146, a fourth core 148 and a fifth core 150 formed from silica-based glass and surrounded by a cladding material 152 which is also formed from silica-based glass. The first core 142, the second core 144, the third core 146, the fourth core 148 and the fifth core 150 can be oriented in parallel with one another in a single plane and spaced such that the crosstalk between adjacent cores is relatively low. The cladding material 152 can be substantially rectangular in cross section. An optical fiber ribbon that is also substantially rectangular in cross section can be formed from the multi-core optical waveguide 140.

The multiple cores 142, 144, 146, 148 150, the cladding material 152, or both can be configured to mitigate the exchange of optical energy between the multiple cores 142, 144, 146, 148 150. For example, in one embodiment, the effective refractive index of each of the multiple cores 142, 144, 146, 148, 150 and the cladding material 152 can be adjusted to match the group delay while, simultaneously reducing the crosstalk. For example, the multiple cores 142, 144, 146, 148, 150 and the cladding material 152 can each comprise silica-based glass dopants including, without limitation, B, F, $GeO_2$, $SiO_2$, $TiO_2$, $ZrO_2$, $Nb_2O_5$ and/or $Ta_2O_5$. Such dopants may be incorporated in the multiple cores 142, 144, 146, 148, 150 either individually or in combination in order to obtain the desired index of refraction.

Each of the multiple cores 142, 144, 146, 148, 150 can include a central core portion 154 surrounded by an outer core portion 156. In one embodiment, the central core portion 154 can have an index of refraction $n_{central}$ and the outer core portion 156 can have an index of refraction $n_{outer}$. The index of refraction $n_{outer}$ of the outer core portion 156 can be of less than or equal to the index of refraction $n_{central}$ the central core portion 154, i.e., each of the multiple cores 142, 144, 146, 148, 150 can be a step index core. The refractive index contrast of each of the multiple cores 142, 144, 146, 148, 150 can be determined by:

$$n_{contrast} = n_{central}/n_{outer} \qquad (1)$$

In order to reduce crosstalk, the refractive index contrast can be set to a value greater than about 100% such as, for example, up to about 150% in one embodiment, up to about 200% in another embodiment, up to about 260% in a further embodiment.

Figure 4:
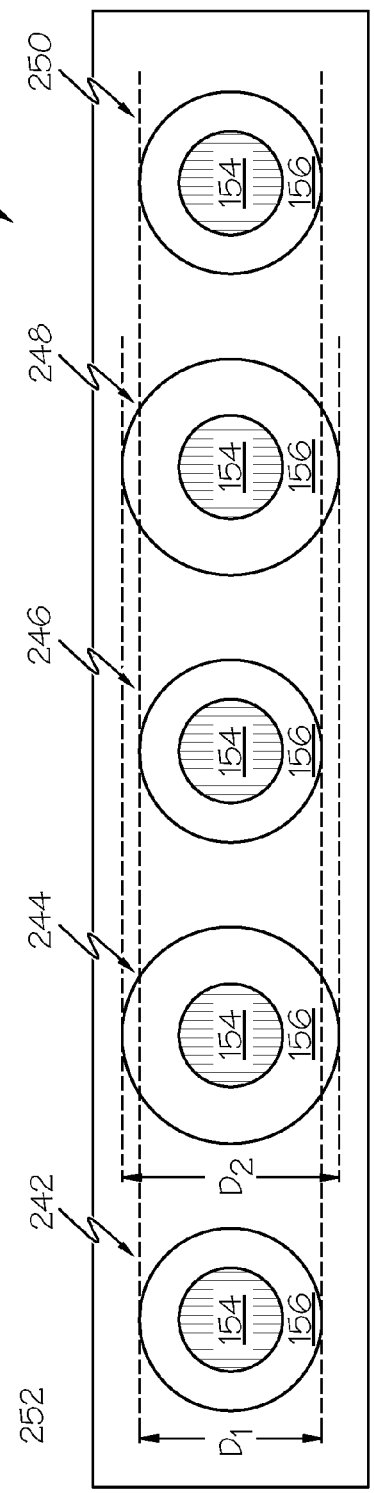
FIG. 4 schematically depicts a multi-core optical waveguide according to one or more embodiments shown and described herein.

Referring now to FIG. 4, the multi-core optical waveguide 240 can comprise a first core 242, a second core 244, a third core 246, a fourth core 248 and a fifth core 250 with varied core diameters. For example, the core diameter can be varied between adjacent cores. In one embodiment, the first core 242, the third core 246, and the fifth core 250 can each have a first core diameter D1 and the second core 244 and the fourth core 248 can each have a second core diameter D2. Crosstalk can be mitigated when the first core diameter D1 is smaller than the second core diameter D2. Optical signals propagating along cores with the relatively large diameter can have an increased relative delay compared to optical signals propagating along cores with a relatively small diameter. To compensate and reduce the mismatch in delay, for the embodiment depicted in FIG. 4, the refractive index contrast of the second core 244 and the fourth core 248 can be reduced with respect to the refractive index contrast of the first core 242, the third core 246, and the fifth core 250. For example, the index increasing dopant levels and the index decreasing dopant levels can be adjusted in the central core portion 154 and/or the outer core portion 156 for any of the multiple cores 142, 144, 146, 148, 150.

It is noted that, while the embodiment depicted in FIG. 4 includes a first core 242, a second core 244, a third core 246, a fourth core 248 and a fifth core 250, the multi-core optical waveguides described herein can include any number of cores. Accordingly, the embodiments described herein can include any number of step index cores of various diameters that are configured to achieve substantially equal delay. Specifically, each core can be configured to have a matched effective refractive index. The effective refractive index can be determined using a weakly-guided mode approximation for the normalized propagation constant of the fundamental mode ($LP_{01}$) in the core, which is given by:

$$n_{index} = 1 - \frac{5.825}{(1 + (4 + V^4)^{1/4})^2} \qquad (2)$$

where V is the normalized frequency, which is given by:

$$V = (n_{central}^2 - n_{outer}^2)^{1/2} ka \qquad (3)$$

where $n_{central}$ and $n_{outer}$ are the refractive indexes of the inner portion of the core and the outer portion of the core, k is the wave number measured in vacuum, and a is the core radius.

Figure 5:
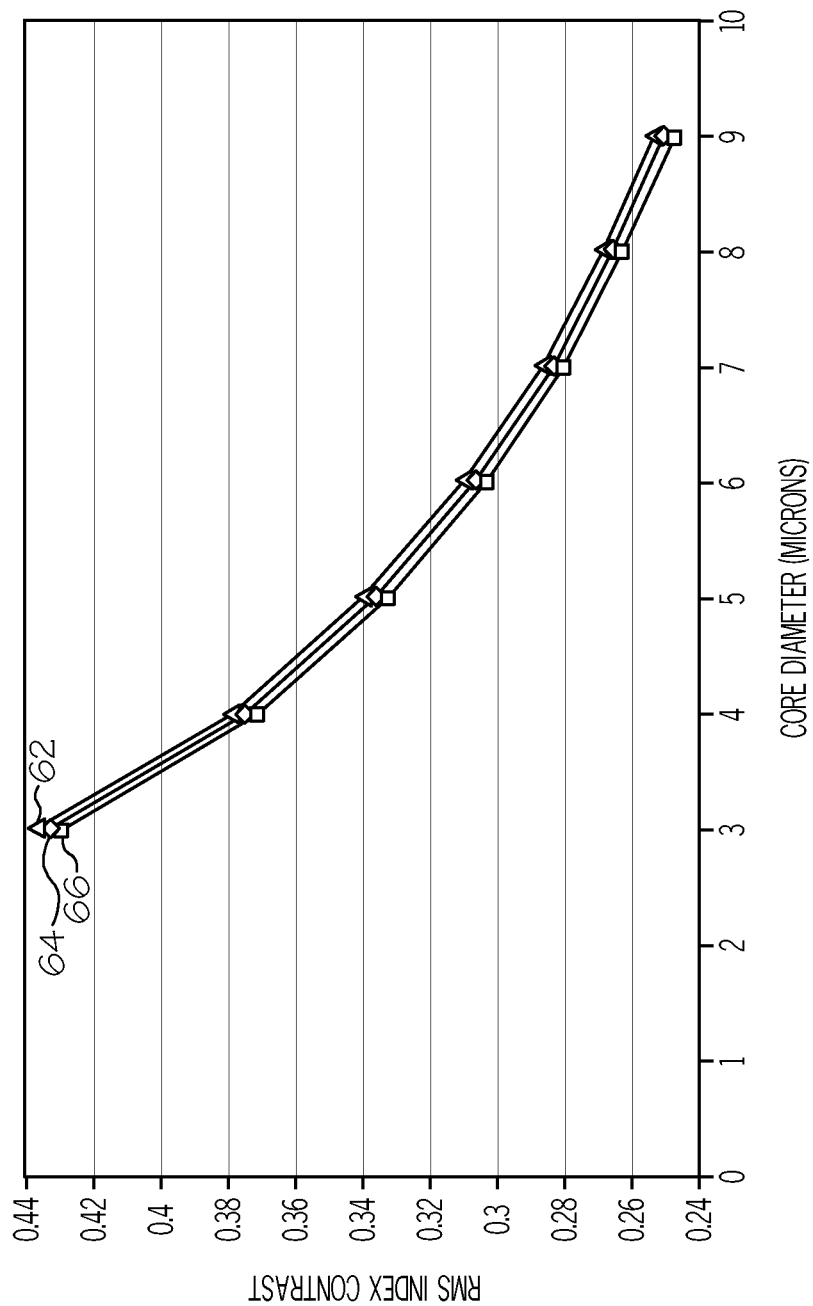
FIG. 5 graphically depicts refractive index contrast versus core diameter according to one or more embodiments shown and described herein.

Referring now to FIG. 5, sets of single mode fiber profile designs characterized by the refractive index contrast (represented by the root mean square of the index difference between central core portion and the outer core portion) and the core diameter in the weakly-guided approximation. Curve 62 represents a solution set for matched delay having a normalized frequency V of about 2.35 and refractive index $n_{outer}$ of about 1.44. Curve 64 represents a solution set for matched delay having a normalized frequency V of about 2.30 and refractive index $n_{outer}$ of about 1.46. Curve 66 represents a solution set for matched delay having a normalized frequency V of about 2.25 and refractive index $n_{outer}$ of about 1.45. Since each of the curve 62, the curve 64 and the curve 66 represent solution sets with a fixed V-number, each of the curve 62, the curve 64 and the curve 66 represents solutions that will exhibit substantially the same propagation constant, substantially the same effective refractive index for the mode, and thus, substantially matched time of flight delay, which can minimize relative delay. It is noted that, while V-numbers below 2.405 generally correspond to single-mode operation, the embodiments described herein can utilize cores operating in higher-order modes. Moreover, there can be several mode-coupled families in which the propagation delay for higher order modes match the fundamental mode described hereinabove.

Referring collectively to FIGS. 6A-6C, the embodiments described herein can include substantially isotropic cores 342 such as, for example, cores with substantially constant refractive index or with relatively gradually varying refractive index as compared to the step index cores (e.g., multiple cores 142, 144, 146, 148 150 (FIG. 3)). For example, a crosstalk barrier can be located between two or more closely spaced cores of the substantially isotropic cores 342 to absorb, scatter or isolate light that emanates from each of the substantially isotropic cores 342.

Referring to FIG. 6A, in one embodiment, each of the substantially isotropic cores 342 within the multi-core optical waveguide 340 can be at least partially surrounded by a crosstalk barrier ring 158. Specifically, the crosstalk barrier ring 158 can have a substantially circular cross section. In further embodiments, the crosstalk barrier ring 158 can have any cross section suitable to mitigate the exchange of optical energy between adjacent cores such as, for example, substantially polygon shaped, or an enclosed irregularly shaped boundary. The crosstalk barrier ring 158 can be formed from any material that causes a discontinuity in the refractive index of the cladding material 152. Suitable materials for causing the discontinuity include scatterers (e.g., air holes, gas holes, nano-bubbles, micro bubbles, or the like), absorbing materials (e.g., dopants, dyes, color centers, semiconductor micro-crystals, semiconductor nano-crystals, acetylene gases, erbium ions, or the like), optically reflective interfaces (e.g., Anti Resonant Optical Waveguides (ARROW), waveguides, doped regions for change in refractive index moats, fluorine doped areas, air pockets for substantially total internal reflection, or air channels for total internal reflection), optical band gaps, and combinations thereof. In an alternative embodiment, depicted in FIG. 6B, the multi-core optical waveguide 440 can comprise a crosstalk barrier ring 258 that is configured to surround a plurality of the substantially isotropic cores 342. It is noted that, while the crosstalk barrier ring 158 and the crosstalk barrier ring 258 are schematically depicted in FIGS. 6A, 6B and 7 as dashed lines, the crosstalk barrier ring 158 and the crosstalk barrier ring 258 generally are formed to have a finite thickness. Without being bound to theory, it is believed that as the thickness of the crosstalk barrier ring 158 or the crosstalk barrier ring 258 increases, effectiveness in mitigation of crosstalk improves, but waveguide density can be impaired. Accordingly, suitable thicknesses can preferably range from about 1 nm to about 2 microns. Furthermore, it is noted that the structure of the crosstalk barrier ring 158 depicted in FIG. 6A may be preferred for crosstalk mitigation because it offers additional benefits due to symmetry.

Referring again to FIG. 6C, the multi-core optical waveguide 540 can comprise one or more optical isolation region 358. The optical isolation region 358 can be any discrete region within the cladding material 152 that causes a discontinuity in the refractive index of the cladding material 152. In one embodiment, the optical isolation region 358 can be substantially rectangular shaped and have a length D3 that is greater than or equal to the diameter of the adjacent core. It is believed that having the length D3 substantially equal to the diameter of the adjacent core may improve manufacturing over embodiments with length D3 substantially greater than or substantially less than the diameter of the adjacent core. In embodiments where the cores are designed to have higher index contrast, the length D3 can be smaller than the diameter of the adjacent core with only small deleterious effects on crosstalk mitigation. The optical isolation region 358 can be formed from any of the absorbing materials or optically reflective interfaces described above. For example, in the embodiment depicted in FIG. 6C, can be formed from optically reflective interfaces such as, for example, a refractive index trench, an air gap, or a gas gap.

Referring now to FIG. 7, it is noted that any of the crosstalk barriers formed via a discontinuity in the refractive index of the cladding material 152 can be utilized together with any type of core material. In one embodiment, multi-core optical waveguide 640 can include the first core 242, the second core 244, the third core 246, the fourth core 248 and the fifth core 250, as described above with reference to FIG. 4. Each of the first core 242, the second core 244, the third core 246, the fourth core 248 and the fifth core 250 can be substantially surrounded by a crosstalk barrier ring 158. The multi-core optical waveguide 640 can further comprise an optical isolation region 358 disposed between each of the first core 242 and the second core 244, the second core 244 and the third core 246, the third core 246 and fourth core 248, and the fourth core 248 and the fifth core 250.

Referring again to FIG. 1, the system 10 for optical differential signaling can comprise a balanced optical receiver 60 that is optically coupled to the multi-core optical waveguide 40. The balanced optical receiver 60 is configured to receive two or more optical signals with differential amplitude modulation with two or more nominally identical photodetectors. The matched photodetectors generally have a design for substantially similar detection parameters such as coupling loss, complex impedance (i.e., capacitance and inductance), signal gain, RF amplitude, phase frequency response, speed of response, sensitivity, responsivity, dark current, or combinations thereof. Without being bound to any particular theory, it is believed that the matched photodetectors can provide improved sensing sensitivity. Each of the matched photodetectors can comprise any device configured to detect light and transform the detected light into a signal indicative of a characteristic of the detected light (e.g., optical power).

Accordingly, the balanced optical receiver 60 can include one or more photodetectors such as, for example, a photodiode, photoresistor, a phototransistor, or the like. It is noted that, while the balanced optical receiver 60 is described herein for use with amplitude modulated signals, the balanced optical receiver 60 can be configured to detect phase modulated complementary signals, frequency or wavelength modulated complementary signals or detection in differential spatial modes. For example, the balanced optical receiver 60 may include multiple phase sensitive discriminators (e.g., MZI) located between the photodetectors and the multi-core optical waveguide 40 for detecting phase modulated complementary signals. Additionally, the balanced optical receiver 60 may include a multi-port band-edge filter for detecting frequency or wavelength modulated complementary signals. Moreover, spatial modulation, the balanced optical receiver 60 can include photodetectors arranged in photodetection regions such as concentric annular regions or other spatial profiles, depending on whether the fiber waveguide has circular symmetry and modal properties of the source.

Referring again to FIG. 2, an embodiment of the system 110 for differential signaling is schematically depicted. The system 110 can optionally comprise a continuous wave optical source 112 (e.g., a continuous wave semiconductor laser or the like) optically coupled to the optical input port 122 of the optical modulation device 120. The system 110 can further comprise a electrical signal generator 114 communicatively coupled to the first electrode 132 of the optical modulation device 120, while the second electrode 134 and the third electrode 136 of the optical modulation device are communicatively coupled to electrical ground. The first optical output port 128, the second optical output port 130, or both can be activated depending on the electrical signal transmitted by the electrical signal generator 114. The first optical output port 128 and the second optical output port 130 can be optically coupled to the balanced optical receiver 160 via the multi-core optical waveguide 40. Alternatively, the first optical output port 128 and the second optical output port 130 can be optically coupled to the balanced optical receiver 160 via two individual fibers (e.g., single mode fiber, multimode fiber, or few-mode fiber) having substantially equal length so that the differential group delay between the two fibers is less than about one period of the optical signals.

In the embodiment depicted in FIG. 2, the balanced optical receiver 160 can comprise two matched photodetectors 162. The electrical outputs of the matched photodetectors 162 can be communicatively coupled to an electrical signal combiner 164 such as, for example, a differential amplifier. The electrical signal combiner 164 can be communicatively coupled to a filtering device 166 such as a low pass filter or the like. The filtering device 166 can be communicatively coupled to a clipping circuit 168 or comparator circuit configured to compare a received signal to a zero current threshold in order to make a decision on the received symbol. The clipping circuit or comparator circuit can be any electrical device configured to remove certain portions of a desired portion from the received signal such as, for example, a slicer, an amplitude selector or a limiter. The performance of the receiver decision can be maximized when the amplitude, phase and noise characteristics of the incoming differential signals are substantially matched. If the amplitude, phase and noise characteristics of the incoming differential signals are unmatched, then the optimum amplitude decision threshold and decision phase point may move away from the zero current state and also may move slightly in time. Accordingly, it is noted that adjustments to the threshold (either in amplitude or phase) may be implemented to account for imperfections in physical hardware implementations.

The system 110 can be configured for M-ary (i.e., binary, quaternary, and any other $2^k$ level signal) differential optical signaling. In one embodiment, the system 110 for can be configured for Pulse Amplitude Modulation (PAM). PAM is a linear modulation scheme whereby information can be encoded into discrete changes of the amplitude of a carrier signal. The time-domain representation of an M-ary PAM signal waveform can be given by the following:

$$s_m(t) = \Re\{A_m g(t) e^{j\omega_s t}\}, \quad m=1,2,\ldots,M, \quad 0 \le t < T \quad (4)$$

where $\Re\{\ \}$ denotes real part, $\omega_s$ is the carrier angular frequency, T is the symbol period, g(t) is the symbol pulse shape, and $A_m$ is the signal amplitude taking discrete values from the set $$A_m \in \{(2l-1-M)d, \quad l=1,2,\ldots,M\} \quad (5)$$

where 2d is the distance between adjacent signal amplitudes.

Figure 8:
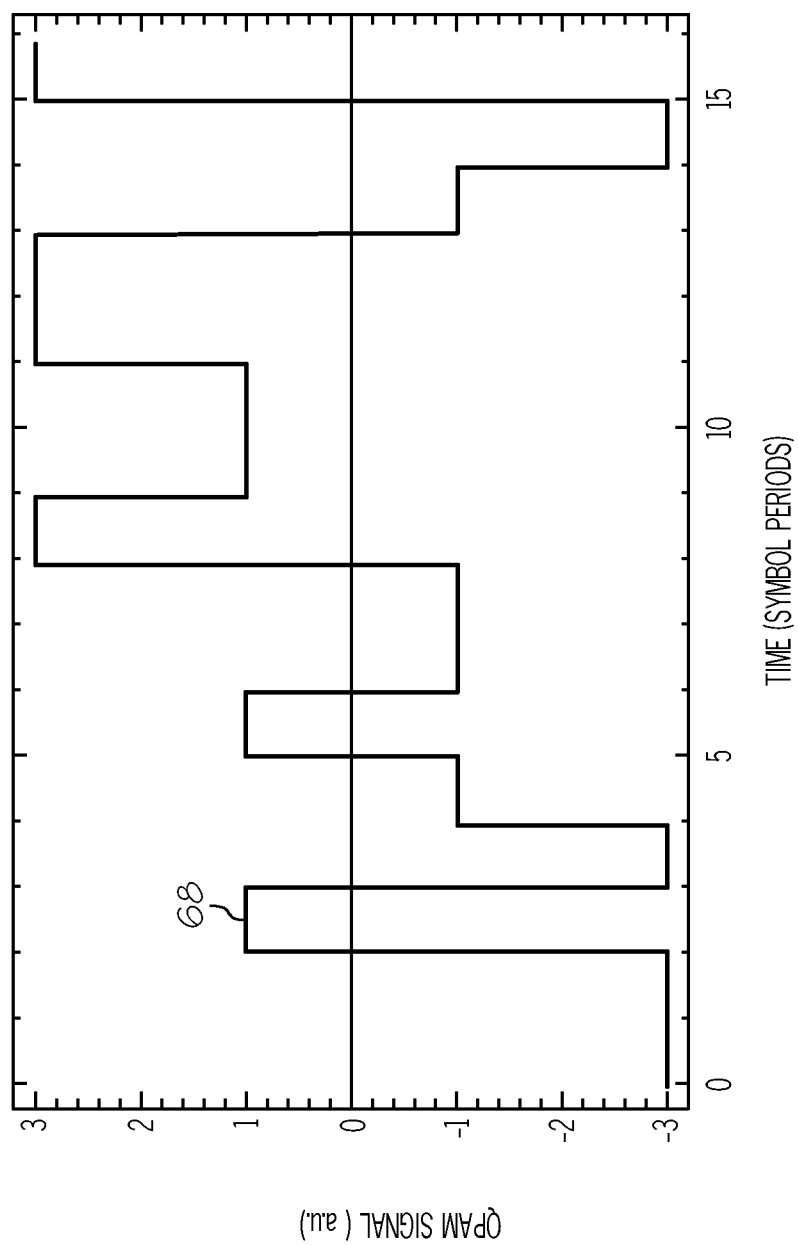
FIG. 8 graphically depicts a QPAM signal that is modulated symmetrically around a zero state according to one or more embodiments shown and described herein.

Referring now to FIG. 8, a baseband ($\omega_s=0$) quaternary PAM (QPAM) signal for rectangular non-return-to-zero pulses is graphically depicted. The QPAM signal 68 has an amplitude that takes the values {−3, −3, 1, −3, −1, 1, −1, −1, 3, 1, 1, 3, 3, −1, −3, 3} in successive symbol periods.

In some embodiments, a baseband QPAM signal can be generated by a linear superposition of two synchronous binary waveforms $v_1(t)$, $v_2(t)$ with bit period T and coefficient ratio 2:1, as given by:

$$V(t) = 2v_1(t) + v_2(t) = 2\sum_k \alpha_k g(t-kT) + \sum_k \beta_k g(t-kT) \quad (6)$$

where the binary waveform amplitudes $\alpha_k$, $\beta_k$ are defined by taking discrete values from the set $\{\pm 1\}$. It is noted that, while the above example describes a particular coefficient ratio for clarity, the embodiments described herein are not limited to any particular coefficient ratio.

Referring back to FIG. 2, as is noted above, the optical modulation device 120 can be an MZM formed in an electro-optic material. In a typical MZM the input port can be optically coupled to light paths of different effective length. Input signal can be split and transmitted down each of the light paths. The split signals can be recombined again at the output. The superposition of the two phase-shifted versions of the optical signal creates interference at each of the device output ports. The interference can lead to the presence of power at an output port if two adjacent bits interfere constructively with each other. Conversely, the interference can lead to the absence of power at an output port if two adjacent bits interfere destructively with each other. The MZM can have two output ports for transmitting complementary output signals, i.e., when there is destructive interference in one of the output ports, there is constructive interference in the other output port, due to energy conservation.

For clarity and without limiting the embodiments described herein to any mathematical theory, a mathematical model for an electro-optic MZM formed in LiNbO$_3$ is provided below. The continuous wave optical source 112 can transmit a light signal into the optical input port 122 of the optical modulation device. The electric field of the light signal at the optical input port 122 can be given by:

$$E_{in}(t) = E_0 e^{j\omega_s t} \quad (7)$$

where $E_0$ is the electric field amplitude and $\omega_s$ is the carrier angular frequency.

The light signal can then be split into two equal parts that traverse the first optical path 124 and the second optical path 126. The two signal parts can experience a differential phase delay Ø(t). The differential phase delay can be expressed as the sum of a phase shift due to the propagation $\phi_0$ and a phase shift due to the voltage dependent refractive index (Pockels effect) due to the application of a bias voltage V(t) (as applied to the first electrode 132), which can be given by:

$$\phi(t) = \varphi_0 - \pi \frac{V(t)}{V_\pi} \quad (8)$$

where the phase shift due to the propagation is given by:

$$\varphi_0 = \frac{2\pi}{\lambda_0} nL \quad (9)$$

The phase shift due to the voltage dependent refractive index is characterized by the voltage ratio $$\frac{V(t)}{V_\pi},$$

where $V_\pi$ is given by:

$$V_\pi = \frac{\lambda_0 d}{rn^3 L} \quad (10)$$

where $\lambda_0$ is the free-space wavelength of the input optical beam, L is the length of the device, d is the distance between the electrodes, n is the effective refractive index in the absence of voltage, and r is the Pockels electro-optic coefficient. The constant $V_\pi$ is commonly called the half-wave voltage.

Neglecting the propagation loss in the MZM, the electric fields at the first optical output port 128 and the second optical output port 130 can be given by:

$$\begin{pmatrix} E_{o,1}(t) \\ E_{o,2}(t) \end{pmatrix} = \begin{pmatrix} \sin\frac{\phi(t)}{2} \\ \cos\frac{\phi(t)}{2} \end{pmatrix} E_{in}(t) \quad (11)$$

Assuming that the matched photodetectors 162 of the balanced optical receiver 160 are ideal quadratic detectors.

The instantaneous optical powers detected by the balanced optical receiver 160 can be given by:

$$\begin{pmatrix} P_1(t) \\ P_2(t) \end{pmatrix} = \begin{pmatrix} \sin^2 \frac{\phi(t)}{2} \\ \cos^2 \frac{\phi(t)}{2} \end{pmatrix} P_{in} \quad (12)$$

where $P_{in}$ is the average power of the light signal at the optical input port 122 of the optical modulation device.

The matched photodetectors 162 can be assumed to have identical responsivity R Since the photodiodes are connected back-to-back, the total photocurrent at the output of the balanced optical receiver 160 can be given by:

$$\begin{aligned} i_{tot}(t) &= R[P_1(t) - P_2(t)] \\ &= R\left[\sin^2\frac{\phi(t)}{2} - \cos^2\frac{\phi(t)}{2}\right]P_{in} \\ &= -RP_{in}\cos\phi(t) \end{aligned} \quad (13)$$

The system 110 for differential optical signaling can be utilized for generating a binary PAM (BPAM) optical signal. It can be assumed that the phase shift due to the propagation is:

$$\phi_0 = 2k\pi \quad (14)$$

The bias voltage V(t) that controls the optical modulation device 120 can be a binary waveform given by:

$$V(t) = \frac{V_\pi}{2} + \frac{V_\pi}{2}\sum_k \alpha_k g(t - kT) \quad (15)$$

where the binary waveform amplitude $\alpha_k$ takes discrete values from the set $\{\pm 1\}$. The constant term in the right hand side of equation (15) can be called DC bias and the time-varying term in the right hand side of equation (15) can be called RF bias.

The system 110 for differential optical signaling can be utilized for generating a QPAM optical signal. The same assumption expressed above in equation (14) can be made regarding the phase shift due to the propagation. For QPAM, the bias voltage V(t) can be a quaternary waveform expressed as a linear superposition of two synchronous binary waveforms with bit period T and coefficient ratio A:B, which can be given by:

$$V(t) = \frac{V_\pi}{2} + \frac{V_\pi}{2}\left[A\sum_k \alpha_k g(t - kT) + B\sum_k \beta_k g(t - kT)\right] \quad (16)$$

In some embodiments, to account for the nonlinearity of the MZM transfer function the coefficient ratio A:B for the superposition of the binary voltage waveforms should not be 2:1 if is desired to generate four equidistant current levels at the output of the balanced optical receiver 160. Therefore, pre-emphasis in electrical signal output by the electrical signal generator 114 can be employed to generate an electrical driver baseband QPAM signal with four non-equidistant voltage levels. When the optical modulation device is formed from an MZM, the maximum peak-to-peak voltage amplitude of the quaternary waveform should be about twice the half-wave voltage of the MZM.

To calculate the coefficient ratio A:B for the superposition of the voltage waveforms, it can be assumed that the total photocurrent at the output of the balanced optical receiver 160 takes discrete values from the set:

$$RP_{in} \in \{-1, -\tfrac{1}{3}, \tfrac{1}{3}, 1\} \quad (17)$$

Therefore, from equation (13):

$$\cos \phi(t) \in \{-1, -\tfrac{1}{3}, \tfrac{1}{3}, 1\} \quad (18)$$

Inverting this trigonometric equation yields:

$$\phi(t) \in \{0, 1.23, 1.91, \pi\} \, rad \quad (19)$$

By substitution, coefficients A, B must satisfy the following equations:

$$\begin{aligned} \frac{\pi}{2} + \frac{\pi}{2}[A + B] &= \pi \text{ rad} \\ \frac{\pi}{2} + \frac{\pi}{2}[A - B] &= 1.91 \text{ rad} \\ \frac{\pi}{2} + \frac{\pi}{2}[-A + B] &= 1.23 \text{ rad} \\ \frac{\pi}{2} + \frac{\pi}{2}[-A - B] &= 0 \text{ rad} \end{aligned} \quad (20)$$

The solution of the system of either the first two or the last two equations of the equation set (20) yields A=0.608173, B=0.391827. Accordingly, the coefficients A, B can be set to be about equal to the derived values for QPAM signaling.

Figure 9:
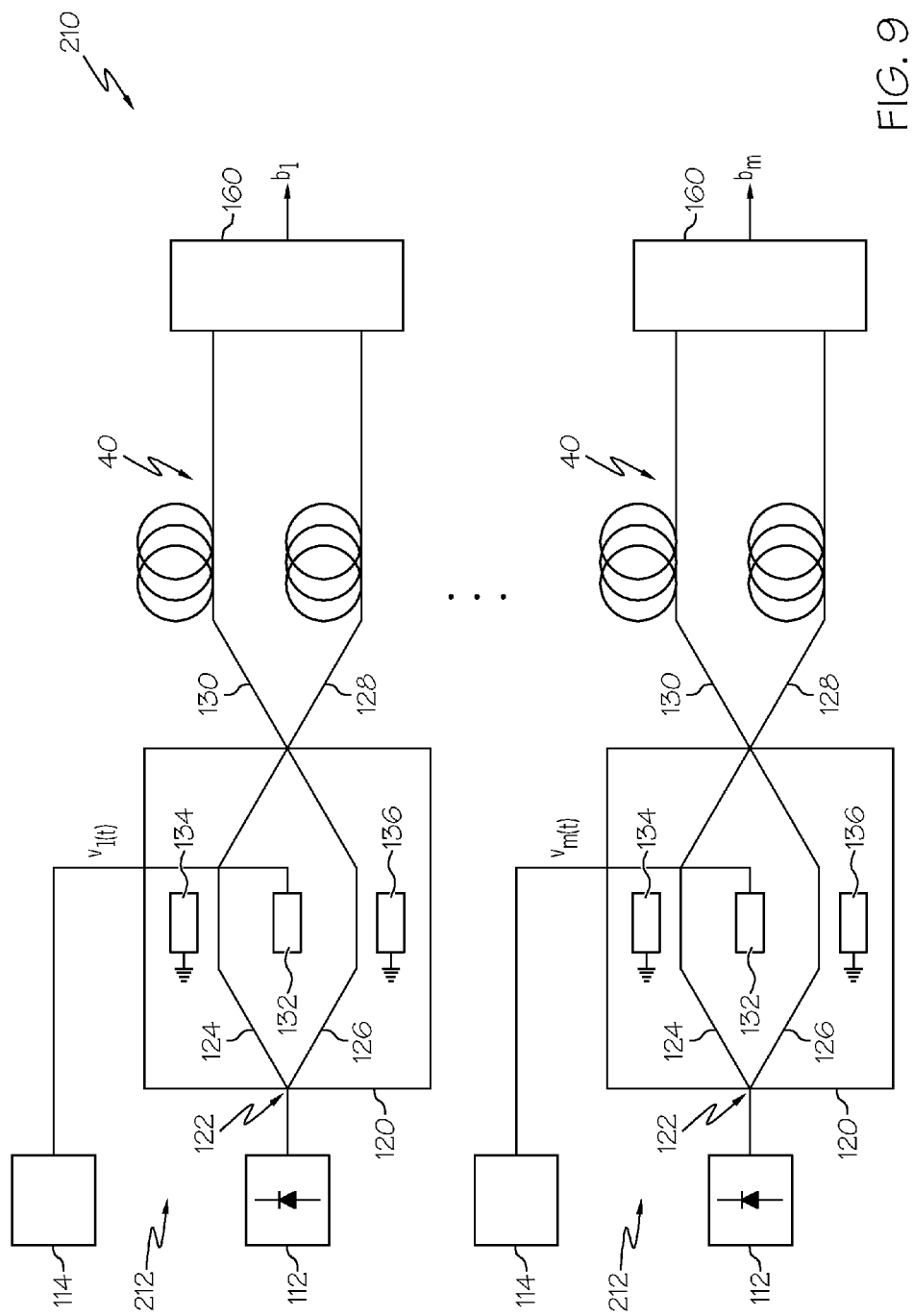
FIG. 9 schematically depicts a system for differential optical signaling according to one or more embodiments shown and described herein.

Referring now to FIG. 9, one embodiment of the system 210 for differential signaling can be utilized for generating M-PAM optical signals, i.e., a signal having $2^m$ levels. The system 210 can include an array of m optical modulation devices 120 and m balanced optical receivers 160 to avoid the generation of multilevel electronic waveforms at the transmitter. It is noted that, while each of the optical modulation devices 120 and balanced optical receivers 160 are depicted in FIG. 9 as being optically coupled by m different multi-core optical waveguides 40, the optical modulation devices 120 and balanced optical receivers 160 can be coupled via one or more multi-core optical waveguides 40.

In one embodiment, the system 210 can include m identical branches in parallel. Each of the branches can be configured to generate an independent BPAM optical signal, as is described above with reference to FIG. 2. Specifically, in each branch 212, a continuous wave optical source 112 can be optically coupled to an optical modulation device 120. At one time interval, the m independent bit sequences corresponding to bits $$b_1, \ldots, b_m \in \{0, 1\} \quad (21)$$

can be detected at the balanced optical receiver 160 of each branch 212. These bits can be considered as the base-2 representation of a M-ary symbol $c_k = (b_1 \ldots b_m)_2$. The corresponding bias voltages $V_l(t)$, l=1, ..., m that drive the Mach-Zehnder modulators have the same form as equation (15).

Figure 10:
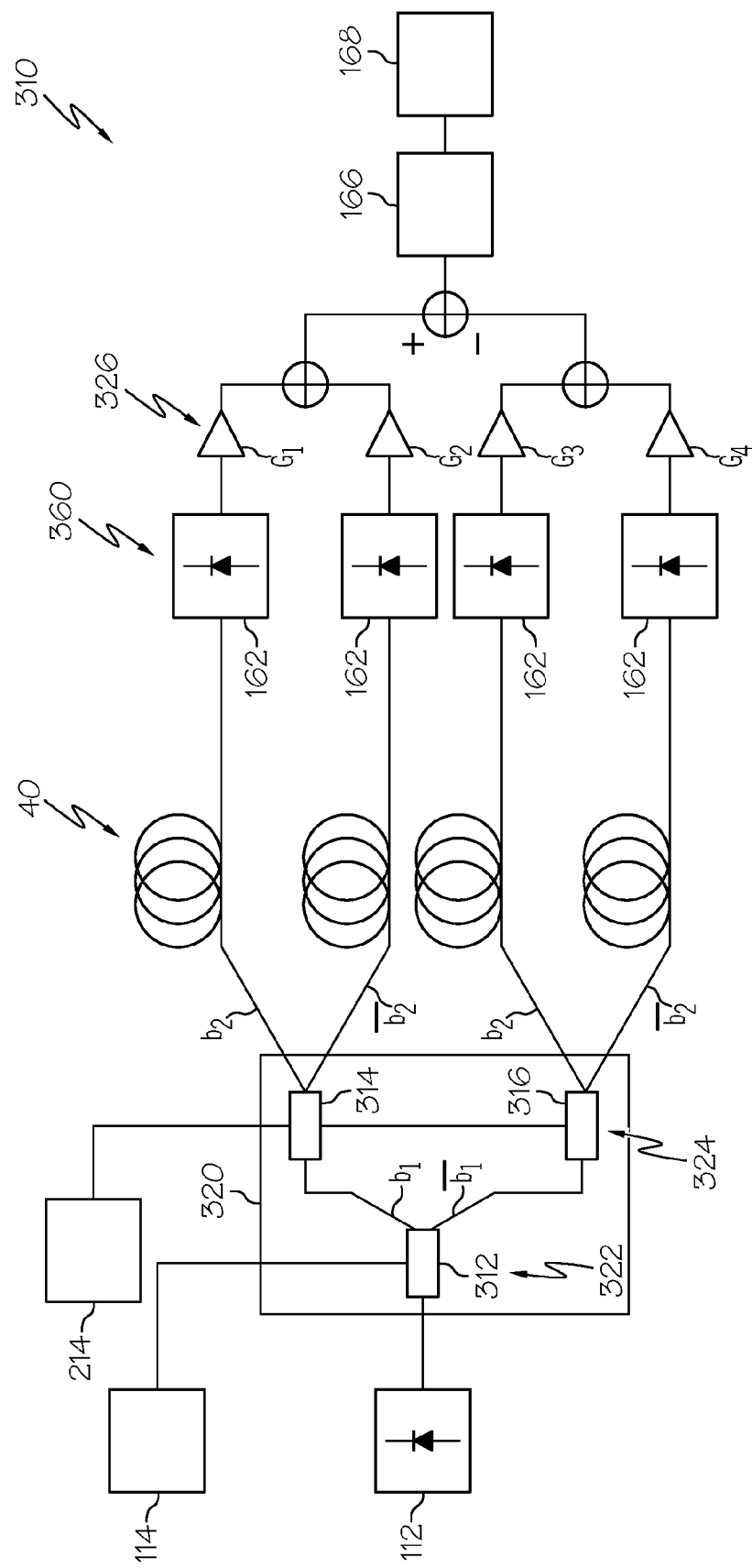
FIG. 10 schematically depicts a system for differential optical signaling according to one or more embodiments shown and described herein.

Referring now to FIG. 10, another embodiment of the system 310 for differential signaling can utilize a 1×m ultrafast switch fabric formed in LiNbO$_3$ as an optical modulation device for generating an M-PAM optical signals having $2^m$ levels. For example, in the embodiment depicted in FIG. 10, the optical modulation device 320 can be a 1×4 ultrafast switch fabric for generating QPAM signals. The optical modulation device 320 can comprise a first stage 322 and a second stage 324 of 1×2 Y-branch switches in a cascading arrangement, i.e., each arm of the switches can be inputs of the next stage.

The first stage 322 can comprise a first Y-branch switch 312 that is optically coupled to a continuous wave optical source 112. The first Y-branch switch 312 can be communicatively coupled to an electrical signal generator 114 that controls the first Y-branch switch 312. The first Y-branch switch 312 can stir the optical signal as bits in either its upper arm $b_1$ or lower arm $\overline{b_1}$ depending on the output of the electrical signal generator 114. For example, if the output is an electrical binary signal, a one can correspond to the upper arm $b_1$ and a zero can correspond to the lower arm $\overline{b_1}$ of the Y-branch switch 312.

The second stage 324 can comprise can comprise a second Y-branch switch 314 that is optically coupled to the upper arm $b_1$ of the first Y-branch switch 312, and a third Y-branch switch 316 that is optically coupled to the lower arm $\overline{b_1}$ of the first Y-branch switch 312. The second Y-branch switch 314 and the third Y-branch switch 316 can be communicatively coupled to an electrical signal generator 214 for control. The second Y-branch switch 314 and the third Y-branch switch 316 can stir the input from the first Y-branch switch 312 in either its upper arm $b_2$ or lower arm $\overline{b_2}$ depending on the output of the electrical signal generator 214. For example, if the output is an electrical binary signal, a one can correspond to the upper arm $b_2$ and a zero can correspond to the lower arm $\overline{b_2}$ of each of the second Y-branch switch 314 and the third Y-branch switch 316.

Accordingly, the first Y-branch switch 312 of the first stage 322 can be controlled by a first binary sequence and the second Y-branch switch 314 and the third Y-branch switch 316 of the second stage 324 can be controlled in parallel by a second binary sequence. The state of all three Y-branch switches 312, 314, 316 can be reset once every bit period T. Assuming that at a specific time interval, the two binary sequences consist of the bits $b_1, b_2 \in \{0,1\}$. The complementary bits can be denoted by $\overline{b_1}, \overline{b_2}$. The instantaneous optical powers detected by the matched photodetectors 162 can be given by the set of equations:

$$P_1(t) = b_1^2 b_2^2 P_{in}$$

$$P_2(t) = b_1^2 \overline{b_1}^2 P_{in}$$

$$P_3(t) = \overline{b_1}^2 b_2^2 P_{in}$$

$$P_4(t) = \overline{b_1}^2 \overline{b_2}^2 P_{in} \qquad (22)$$

where $P_{in}$ is the average power of the light signal received by the first Y-branch switch 312 of the first stage 322 of the optical modulation device 320.

Each of the matched photodetectors 162 can be communicatively coupled to an array of gain devices 326 each having a configurable gain $G_1$, $G_2$, $G_3$, $G_4$. The total photocurrent at the output of the balanced receiver 360 can be given by:

$$i_{tot}(t) = R[G_1 P_1(t) + G_2 P_2(t) - G_3 P_3(t) - G_4 P_4(t)] \qquad (23)$$

By selecting the selecting the appropriate gain $G_1$, $G_2$, $G_3$, $G_4$ for each of the gain devices 326, the output of balanced receiver 360 can yield an M-ary signal. Specifically, by setting $G_1 = G_4 = 1$, $G_2 = G_3 = \frac{1}{3}$, the final photocurrent output from the balanced receiver 360 can be a QPAM signal. It is noted that, while the embodiment of the system 310 depicted in FIG. 10 comprise a 1×4 switch fabric configured for QPAM signals, the embodiments described herein can be generalized to a 1×m switch fabric by including additional stages for higher-order M-PAM signals.

Figure 11:
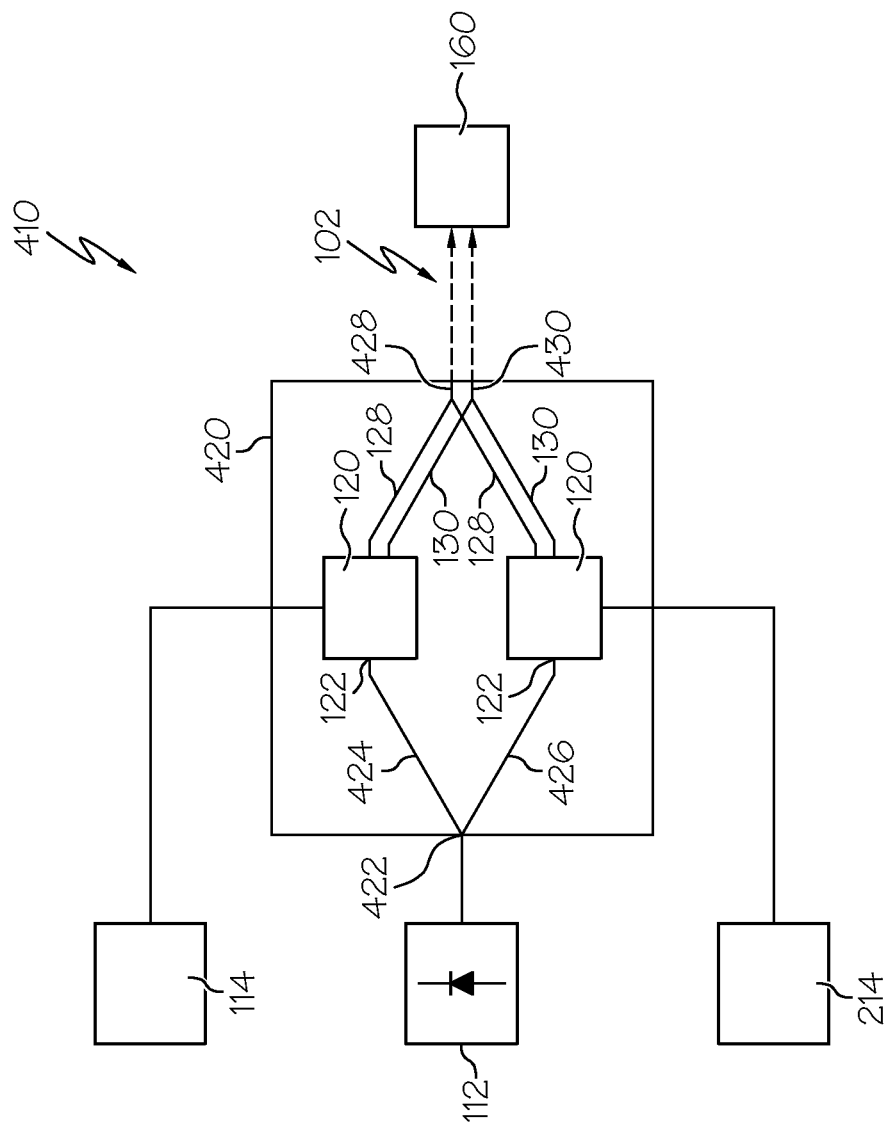
FIG. 11 schematically depicts a system for differential optical signaling according to one or more embodiments shown and described herein.

Referring now to FIG. 11, a further embodiment of the system 410 for differential signaling is schematically depicted. The optical modulation device 420 can be formed from an MZI with nested optical modulation devices 120. In some embodiments, as is noted above, each of the optical modulation devices 120 can be formed from an MZM. Accordingly, the optical modulation device can be formed from two dual-output MZM's placed inside an MZI with asymmetric output couplers.

In one embodiment, a continuous wave optical source 112 can be optically coupled to the optical input port 422 of the optical modulation device 420. The optical input port 422 can be split into a first optical path 424 and a second optical path 426. Each of the first optical path 424 and the second optical path 426 can be optically coupled to an optical modulation device 120. As is described above, each of the optical modulation devices 120 can have a first optical output port 128 and a second optical output port 130. Each of the first optical output ports 128 of the optical modulation device 120 can be combined and optically coupled to the first optical output port 428 of the optical modulation device 420. Similarly, each of the second optical output ports 130 of the optical modulation device 120 can be combined and optically coupled to the second optical output port 430 of the optical modulation device 420.

A first electrical signal generator 114 can be communicatively coupled to one of the optical modulation devices 120 and a second electrical signal generator 214 can be communicatively coupled to the other optical modulation device 120. The electrical signal generators 114, 214 can be configured to generate binary waveforms to independently control the optical modulation devices 120. The binary waveforms can be expressed as:

$$v_1(t) = V_\pi \sum_k \alpha_k g(t - kT) \qquad (24)$$

$$v_2(t) = V_\pi \sum_k \beta_k g(t - kT)$$

where the binary waveform amplitudes $\alpha_k$, $\beta_k$ takes discrete values from the set $\{0,1\}$.

Neglecting the propagation loss in the optical modulation device 420 and assuming an amplitude coupling ratio of the output coupler equal to A:B, the electric fields of the complimentary modulated optical signals 102 at the k-th time interval can be given by:

$$\begin{pmatrix} E_{o,1}(t) \\ E_{o,2}(t) \end{pmatrix} = \frac{j}{2} \begin{pmatrix} \alpha_k A + j\beta_k B \\ j\alpha_k A + \beta_k B \end{pmatrix} E_{in}(t) \qquad (25)$$

The complimentary modulated optical signals 102 can be transmitted to and received by the balanced optical receiver 160. It can be assumed that the balanced optical receiver 160 comprises photodiodes that are ideal quadratic detectors. Accordingly, the instantaneous optical powers detected by the balanced optical receiver 160 can be given by:

$$\begin{pmatrix} P_1(t) \\ P_2(t) \end{pmatrix} = \frac{1}{4} \begin{pmatrix} \alpha_k^2 A^2 + \beta_k^2 B^2 \\ \overline{\alpha_k^2} A^2 + \overline{\beta_k^2} B^2 \end{pmatrix} E_{in}(t) \qquad (26)$$

where $P_{in}$ is the average power of the light signal at the optical input port 422 of the optical modulation device 420.

The balanced optical receiver 160 can include two balanced photodiodes, and it may be assumed that each of the balanced photodiodes has substantially identical responsivity R. Moreover, the photodiodes can be connected back-to-back. Accordingly, the total photocurrent at the output of the balanced optical receiver 160 can be given by:

$$i_{tot}(t) = R[P_1(t) - P_2(t)] \qquad (27)$$
$$= \frac{RP_{in}}{4}\left[(\alpha_k^2 - \bar{\alpha}_k^2)A^2 + (\beta_k^2 - \bar{\beta}_k^2)B^2\right]$$

By selecting $A=\sqrt{3/2}$, $B=1$, the total photocurrent can be configured to yield a QPAM signal.

The performance of the M-ary PAM differential signaling can be compared, in terms of the required received average optical energy per bit, to conventional M-ary intensity modulation (IM)/direct detection (DD). It can be assumed that the electric photocurrent at the output from an optical receiver front-end can be written as a pulse train, given by:

$$i(t) = \sum_{m=-\infty}^{\infty} I_m g(t - mT_s) + n(t) \qquad (28)$$

where $I_m$ is the photocurrent corresponding to the m-th received symbol (i.e., $I_m = RP_m$, with R denoting the photodiode responsivity and $P_m$ denoting the received optical power for the m-th symbol), $T_s$ is the symbol period, n(t) is the receiver shot and thermal noise, and g(t) is the pulse shape.

It can further be assumed that both the shot noise and the thermal noise are additive white Gaussian noises. In addition, the pulse shape can be the idealized case of a sin c pulse shape, given by:

$$g(t) = \sin(\pi t/T_s)/(\pi t/T_s) \qquad (29)$$

Sin c pulses belong to the family of raised cosine spectrum pulses that satisfy Nyquist's criterion for zero intersymbol interference (ISI). Their spectrum G(f) is substantially rectangular $$G(f) = T_s, |f| \le \tfrac{1}{2}T_s \qquad (30)$$

Furthermore, it can be assumed that the DD receiver front-end is followed by a matched lowpass filter with unit transfer function:

$$H(f) = 1, |f| \le 1/(2T_s) \qquad (31)$$

At the output of the matched filter, the receiver decision circuit can sample the photocurrent once per symbol:

$$i(kT_s) = I_k + n_k \qquad (32)$$

where $n_k = n(kT_s)$ are the filtered samples of the receiver shot and thermal noise. The latter follow a Gaussian distribution with zero mean and variance:

$$\sigma_k^2 = \sigma_{sh,k}^2 + \sigma_{th}^2, \qquad (33)$$

where $\sigma_{sh,k}^2$, $\sigma_{th}^2$ are the variances of the shot and thermal photocurrent noise for the k-th symbol. The IM/DD receivers for optical interconnects can operate deep into the thermal noise limit, where the shot noise variance is smaller by an order of magnitude compared to the thermal noise variance. Therefore, the following simplification can be made:

$$\sigma_k^2 \cong \sigma_{th}^2 = 2i_{th}^2 B \qquad (34)$$

where $i_{th}$ is the rms value of the equivalent input electric noise current power spectral density, expressed in pA/$\sqrt{\text{Hz}}$, and B is the matched filter bandwidth, which is equal to:

$$B = 1/(2T_s) \qquad (35)$$

It is worth noting that successive samples of the filtered receiver shot and thermal noise in equation (34) are uncorrelated due to the shape of the matched filter.

For M-ary PAM, in the absence of thermal noise, the samples of the photocurrent at the receiver output can correspond to M distinct equidistant levels $I_0$-$I_{M-1}$. Words of $k=\log_2 M$ bits can be assigned to different photocurrent levels using Gray encoding i.e., words corresponding to adjacent signal levels can differ by one bit. In the presence of thermal noise, the samples of the photocurrent at the receiver output differ from their nominal position. Decision thresholds can be placed at mid-point between successive levels.

Accordingly, it is possible to calculate the bit error probability $P_{e|b}$ of both M-ary PAM differential signaling and conventional M-ary IM/DD according to:

$$P_{e|b} = (M-1)\text{erfc}[\sqrt{d^2/(2\sigma_{th}^2)}]/(M\sqrt{\log_2 M}) \qquad (36)$$

Where 2d is the distance between adjacent current levels and the complementary error function is given by:

$$\text{erfc}(z) = (2/\sqrt{\pi})\int_z^\infty e^{-t^2}\,dt \qquad (37)$$

Assuming that for M-ary PAM differential signaling, the current levels take discrete values from the set:

$$I_m \in \{(2l-1-M)d\},\ l=1,2,\ldots,M, \qquad (38)$$

whereas for conventional M-ary IM/DD, the current levels take discrete values from the set $$I_m \in \{2ld\},\ l=0,2,\ldots,M-1. \qquad (39)$$

The corresponding received average powers in both cases can be expressed by:

$$\bar{P}_{M\text{-}PAM} = \bar{P}_{M\text{-}IM/DD} = (M-1)d/R \qquad (40)$$

Both M-ary PAM differential signaling and conventional IM/DD can have the same receiver sensitivity. However, in the case of M-ary PAM differential signaling, the average transmitted power of the continuous wave optical source can be 3 dB lower compared to its conventional IM/DD counterpart because of the complimentary modulated optical signals. For example, the optical power from both branches of an MZM's output coupler is used.

An increase in the number of levels from the binary case within the same modulation family can induce an asymptotic optical energy/b penalty at very low error probabilities which can be given by:

$$P_d = 10\log[(M-1)/\sqrt{\log_2 M}] \qquad (41)$$

Figure 12:
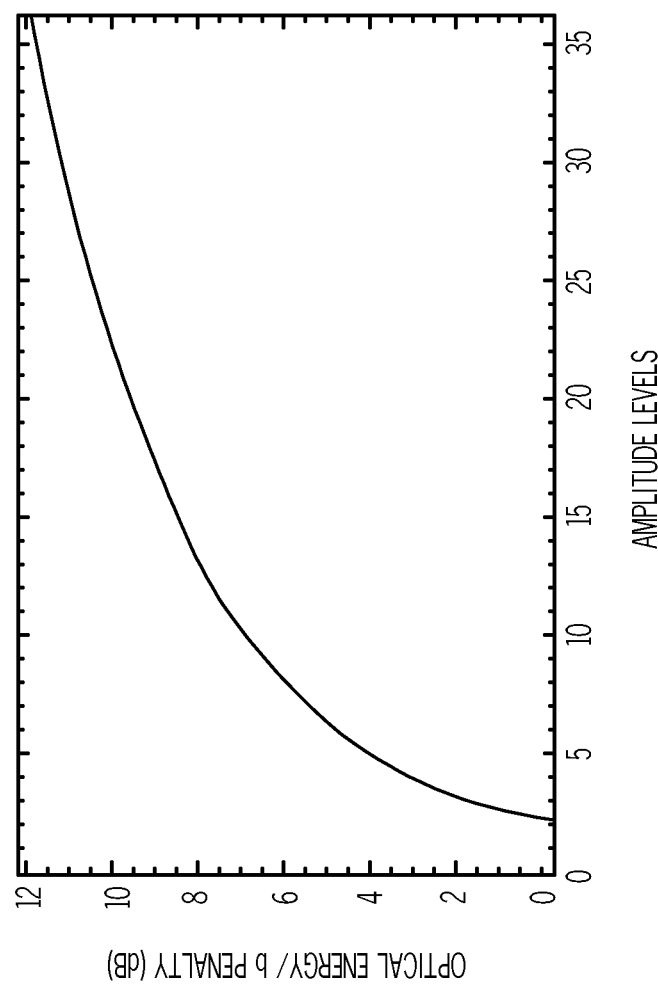
FIG. 12 graphically depicts optical energy/b penalty versus amplitude levels according to one or more embodiments shown and described herein.

Referring now to FIG. 12, the optical energy/b penalty is plotted as a function of the number of levels. For example, the optical energy/b penalty compared to the binary case to transition from binary to QPAM is about 3.26 dB.

Based on the foregoing, it is believed that the use of BPAM differential optical signaling can decrease the optical energy consumption by a factor of 3 dB compared to conventional IM/DD links. Moreover, it is believed that the use of QPAM differential signaling can exchange the 3-dB optical energy advantage in order to halve the symbol rate compared to conventional binary IM/DD. The decrease in the line rate can result in a reduction in the components cost, quadrupling the link robustness against chromatic dispersion, and reduce the energy dissipation of the transceiver electronics.

It should now be understood that the embodiments described herein can be utilized for differential optical signaling. The systems described herein can include optical modulation devices (e.g., MZM or MZI) optically coupled to balanced optical receivers to generate M-ary PAM signals. In some embodiments, an electronic M-ary symbol sequence can be synthesized by adding a plurality of binary bit-synchronous bit sequences having a bit rate equal to the symbol rate and unequal voltage ratios. In further embodiments, M-ary PAM optical signals can be synthesized by adding in phase multiple binary PAM signals with unequal field-amplitude ratios. Furthermore, optical M-ary PAM signals can be generated using a nested MZI with asymmetric branches and an external modulator (MZM) on each branch. M-ary PAM optical signals can be utilized to reduce the overall power consumption of high-performance computing optical interconnects and data centers. Specifically, complementary M-ary PAM optical waveforms can reduce transmitted optical power by 3 dB compared to conventional M-ary IM/DD. Furthermore, complementary M-ary PAM optical waveforms allow for setting the decision threshold of a direct detection receiver to zero, a significant simplification over conventional IM/DD. Specifically, the decision threshold can be fixed at the zero crossing and the M-ary PAM can be placed symmetrically around that zero state.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for transmitting differential optical signals comprising:
   an optical modulation device comprising at least one optical input port and multiple optical output ports, wherein an optical input signal having an input power is received at the at least one optical input port and the optical modulation device transforms the optical input signal into multiple complimentary modulated optical signals that are transmitted from the multiple optical output ports each having an output power, and wherein a sum of the output power of each of the multiple complimentary modulated optical signals is substantially equal to the input power of the optical input signal that was received by the at least one optical input port of the optical modulation device;
   a multi-core optical waveguide optically coupled to the multiple optical output ports of the optical modulation device, the multi-core optical waveguide comprising multiple cores disposed within a cladding material, wherein the multiple cores, the cladding material, or both are configured to mitigate exchange of optical energy between the multiple cores; and
   a balanced optical receiver comprising multiple photodetectors, wherein the balanced optical receiver is communicatively coupled to the multiple cores of the multi-core optical waveguide and each of the multiple photodetectors transforms at least one of the multiple complimentary modulated optical signals into an electrical signal, and wherein the electrical signal of the multiple photodetectors of the balanced optical receiver is combined to form a pulse amplitude modulated signal.

2. The system of claim 1, wherein the optical modulation device is a Mach-Zehnder modulator.

3. The system of claim 1, wherein the optical modulation device comprises a plurality of Mach-Zehnder modulators that are arranged in parallel, such that each of the plurality of Mach-Zehnder modulators transmits a pair of the multiple complimentary modulated optical signals.

4. The system of claim 1, wherein the optical modulation device is formed from a switch fabric and at least 3 switches, such that a plurality of switches are arranged in a cascading arrangement.

5. The system of claim 1, wherein the optical modulation device is formed from a switch fabric and the switch fabric: comprises a plurality of at least three Y-branch switches in a cascading arrangement.

6. The system of claim 1, wherein the optical modulation device is formed from a Mach-Zehnder interferometer with nested optical modulators.

7. The system of claim 6, wherein the optical modulators nested within the Mach-Zehnder interferometer are Mach-Zehnder modulators.

8. The system of claim 1, wherein the pulse amplitude modulated signal is modulated symmetrically about a zero crossing.

9. The system of claim 8, wherein the pulse amplitude modulated signal is M-ary.

10. The system of claim 1, wherein the multiple photodetectors are: (i) matched photodetectors having substantially identical speeds of response, sensitivities, responsivities and dark currents; or (ii) photodiodes.

11. The system of claim 1, wherein the multi-core optical waveguide is an optical fiber ribbon.

12. The system of claim 1, wherein: (i) each of the multiple cores of the multi-core optical waveguide has a matched effective refractive index; or (iii) the multiple cores of the multi-core optical waveguide comprises a first core having a relatively small diameter and a second core having a relatively large diameter, and wherein the first core is an adjacent core to the second core.

13. The system of claim 1, wherein the multiple cores comprise: (i) silica-based glass that is doped with B, F, $GeO_2$, $SiO_2$, $TiO_2$, $ZrO_2$, $Nb_2O_5$, $Ta_2O_5$, or a combination thereof.

14. The system of claim 1, wherein: (i) each of the multiple cores of the multi-core optical waveguide is a step index core or (ii) each of the multiple cores of the multi-core optical waveguide is substantially surrounded by a crosstalk barrier ring.

15. The system of claim 14, wherein the crosstalk barrier ring is formed from a material that causes a refractive index discontinuity in the cladding material.

16. The system of claim 15, wherein the crosstalk barrier ring is formed from a scatterer, an absorbing material, or a combination thereof.

17. The system of claim 1, wherein two or more of the multiple cores of the multi-core optical waveguide is substantially surrounded by one crosstalk barrier ring.

18. The system of claim 1, wherein an optical isolation region is located between two of the multiple cores of the multi-core optical waveguide.

19. The system of claim 18, wherein the optical isolation region is formed from an optically reflective interface.

20. The system of claim 1, wherein:
- the multiple cores of the multi-core optical waveguide comprises a first core having a relatively small diameter and a second core having a relatively large diameter;
- the first core is an adjacent core to the second core;
- each of the first core and the second core of the multi-core optical waveguide is substantially surrounded by a crosstalk barrier ring; and
- an optical isolation region is located between the first core and the second core of the multi-core optical waveguide.

\* \* \* \* \*